(12) United States Patent
Sakai et al.

(10) Patent No.: US 8,932,132 B2
(45) Date of Patent: Jan. 13, 2015

(54) DATA ACCESS MANAGEMENT METHOD AND DATA ACCESS MANAGEMENT SYSTEM

(75) Inventors: Masaharu Sakai, Tokyo (JP); Akiko Iwaya, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/369,330

(22) Filed: Feb. 9, 2012

(65) Prior Publication Data

US 2012/0231880 A1 Sep. 13, 2012

(30) Foreign Application Priority Data

Mar. 8, 2011 (JP) ................. 2011-050727

(51) Int. Cl.
 - A63F 9/24 (2006.01)
 - G06F 15/16 (2006.01)
 - A63F 13/30 (2014.01)

(52) U.S. Cl.
 CPC ........... *A63F 13/12* (2013.01); *A63F 2300/554* (2013.01); *A63F 2300/5546* (2013.01); *A63F 2300/5586* (2013.01); *A63F 2300/5593* (2013.01)
 USPC ........................................... 463/29; 709/219

(58) Field of Classification Search
 USPC .......................................................... 463/24
 See application file for complete search history.

(56) References Cited

U.S. PATENT DOCUMENTS

| | | | | |
|---|---|---|---|---|
| 6,811,490 B2 * | 11/2004 | Rubin | ............................. | 463/43 |
| 7,363,443 B2 * | 4/2008 | Rubin | ........................... | 711/159 |
| 2002/0142845 A1 * | 10/2002 | Whitten et al. | ................. | 463/43 |
| 2003/0003977 A1 * | 1/2003 | Takahashi et al. | ................. | 463/3 |
| 2006/0287080 A1 * | 12/2006 | Bychkov | ......................... | 463/29 |
| 2008/0227552 A1 | 9/2008 | Shimomura | | |

(Continued)

FOREIGN PATENT DOCUMENTS

| | | |
|---|---|---|
| EP | 1684206 A2 | 7/2006 |
| JP | 2004680 A | 1/2004 |

(Continued)

OTHER PUBLICATIONS

European Search Report for corresponding EP Application No. 12001361.0-2218, dated Jun. 6, 2012.

(Continued)

*Primary Examiner* — Steven J Hylinski
*Assistant Examiner* — George Howarah
(74) *Attorney, Agent, or Firm* — Matthew B. Dernier, Esq.; Gibson & Dernier LLP

(57) ABSTRACT

A processor is allowed to receive a request for downloading save data of a game, to check, in reference to a list containing an identifier that identifies the save data, an attribute indicating whether download of the save data is restricted, and a next downloadable time in association with one another, whether the save data has the attribute that indicates the download is restricted, to check, when the save data has the attribute that indicates the download is restricted, whether the request for downloading the save data was received at or after the time at which the save data becomes downloadable again, and to reject the request for downloading the save data and notify a user the next downloadable time when the request for downloading the save data was received before the time at which the save data becomes downloadable again.

7 Claims, 10 Drawing Sheets

| USER ID △△△△△ | SAVE DATA ID | ID XXXX | DOWNLOAD RESTRICTION | YES |
|---|---|---|---|---|
| | | | DOWNLOADABLE TIME | YEAR×××× MONTH×× DAY×× MINUTE×× SECOND×× |
| | | ID YYYY | DOWNLOAD RESTRICTION | NO |
| | | | DOWNLOADABLE TIME | — |
| | | . | . | . |
| | | . | . | . |
| | | . | . | . |
| | | ID ZZZZ | DOWNLOAD RESTRICTION | YES |
| | | | DOWNLOADABLE TIME | YEAR○○○ MONTH○○ DAY○○ MINUTE○○ SECOND○○ |

106

(56) References Cited

U.S. PATENT DOCUMENTS

| | | | |
|---|---|---|---|
| 2009/0011838 A1* | 1/2009 | Miyamoto | 463/43 |
| 2009/0325690 A1* | 12/2009 | Zhou et al. | 463/29 |
| 2011/0078731 A1* | 3/2011 | Nishimura | 725/39 |

FOREIGN PATENT DOCUMENTS

| | | | | |
|---|---|---|---|---|
| JP | 2004000680 A | * | 1/2004 | ............ A63F 13/10 |
| JP | 2008220645 A | * | 9/2008 | |
| JP | 2008264136 A | * | 11/2008 | |
| JP | 200911569 A | | 1/2009 | |
| JP | 2009011569 A | * | 1/2009 | |
| KR | 20020022062 | | 3/2002 | |
| KR | 20050022279 | | 3/2005 | |

OTHER PUBLICATIONS

Japanese Office Action for corresponding JP Application No. 2011-050727, dated Oct. 30, 2012.

Office Action issued for corresponding Japanese Patent Application No. 2011-050727, dated Jun. 18, 2013.

Office Action issued for corresponding Korean Patent Application No. 10-2012-0020973, dated Dec. 26, 2013.

* cited by examiner

FIG.4

| USER ID △△△△△ | SAVE DATA ID | | |
|---|---|---|---|
| | ID XXXX | DOWNLOAD RESTRICTION | YES |
| | | DOWNLOADABLE TIME | YEARxxxx MONTHxx DAYxx MINUTExx SECONDxx |
| | ID YYYY | DOWNLOAD RESTRICTION | NO |
| | | DOWNLOADABLE TIME | — |
| | ... | ... | ... |
| | ID ZZZZ | DOWNLOAD RESTRICTION | YES |
| | | DOWNLOADABLE TIME | YEARoooo MONTHoo DAYoo MINUTEoo SECONDoo |

106

DATA ACCESS MANAGEMENT METHOD AND DATA ACCESS MANAGEMENT SYSTEM

BACKGROUND OF THE INVENTION

1. Field of the Invention

The present invention relates to a data access management method and a data access management system and particularly to a method and system for managing upload and download of game save data to and from an online storage via a network.

2. Description of the Related Art

In recent years, network communication technology including the Internet has been rapidly developed, and so-called cloud services have been provided that allow the user to easily upload digital data such as pictures and documents to an online server and download data from the server.

The use of cloud services allows the user to, for example, edit a document, which had been prepared at work, at home without carrying the document. Also, storing in a storage server on a network the digital data of pictures captured with use of a digital camera allows the data to be shared anytime, anywhere by multiple users.

Such cloud services can also be used to manage save data of a game. However, different from picture data or documents, it is desired to put restrictions on the timing for the saving and loading of save data of a game, from the perspective of ensuring game values represented by the entertainment value of the game and the balance of the game. As described, in order for the management of save data of a game or the like on a network, it is considered that there is room for improvement in existing cloud services.

SUMMARY OF THE INVENTION

In this background, a purpose of the present invention is to provide cloud service technology for managing save data of a game.

One embodiment of the present invention relates to a data access management method. The method allows a processor to receive via a network a request for downloading save data serving as status information that is updated according to the progress of a game, to check, in reference to a list acquired from a database listing an identifier that uniquely identifies the save data, an attribute indicating whether or not downloading of the save data is restricted, and a next downloadable time in association with one another and then stored in memory, whether or not the save data requested to be downloaded has the attribute that indicates the download is restricted, to check, when the save data requested to be downloaded has the attribute that indicates the download is restricted, whether or not the request for downloading the save data was received at or after the time at which the save data becomes downloadable again in reference to the list acquired from the database, and to reject the request for downloading the save data and to notify a user the next downloadable time when the request for downloading the save data was received before the time at which the save data becomes downloadable again.

Another embodiment of the present invention relates to a data access management system. The system comprises: a server; and a plurality of information terminal apparatuses connected to the server via a network. The server includes: a request reception unit for receiving a request for downloading save data from any one of the plurality of information terminal apparatuses via a network; a database listing an identifier that uniquely identifies the save data and an attribute and additional information of the save data in association with each other; and a database management unit for transmitting a list stored in the database to the information terminal apparatus from which the request for downloading the save data was made. Each of the plurality of the information terminal apparatuses includes: a list acquisition unit for making a request for downloading the save data from the server and acquiring the list from the server, via a network; an attribute check unit for checking whether or not the save data requested to be downloaded has an attribute that indicates the download is restricted in reference to the list acquired by the list acquisition unit; a time check unit for checking, when the save data requested to be downloaded has the attribute that indicates the download is restricted, whether or not the request for downloading the save data was made at or after the time at which the save data becomes downloadable again in reference to the list; a notification unit for notifying a user of next downloadable time when the request for downloading the save data was made before the time at which the save data becomes downloadable again; a download execution unit for allowing the save data to be downloaded from the server when the save data requested to be downloaded does not have the attribute that indicates the download is restricted or when the request for downloading the save data was made after the time at which the save data becomes downloadable again such that the save data is downloadable; and a time update unit for transmitting to the database the next downloadable time as updated. The database management unit stores the list acquired from the time update unit in the database and updates the list.

Optional combinations of the aforementioned constituting elements, and implementations of the invention in the form of methods, apparatuses, systems, computer programs, data structures, and recording media may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 4 is a diagram schematically illustrating an example of a list stored in a database according to the embodiment;

DETAILED DESCRIPTION OF THE INVENTION

The invention will now be described by reference to the preferred embodiments. This does not intend to limit the scope of the present invention, but to exemplify the invention.

Figure 1:
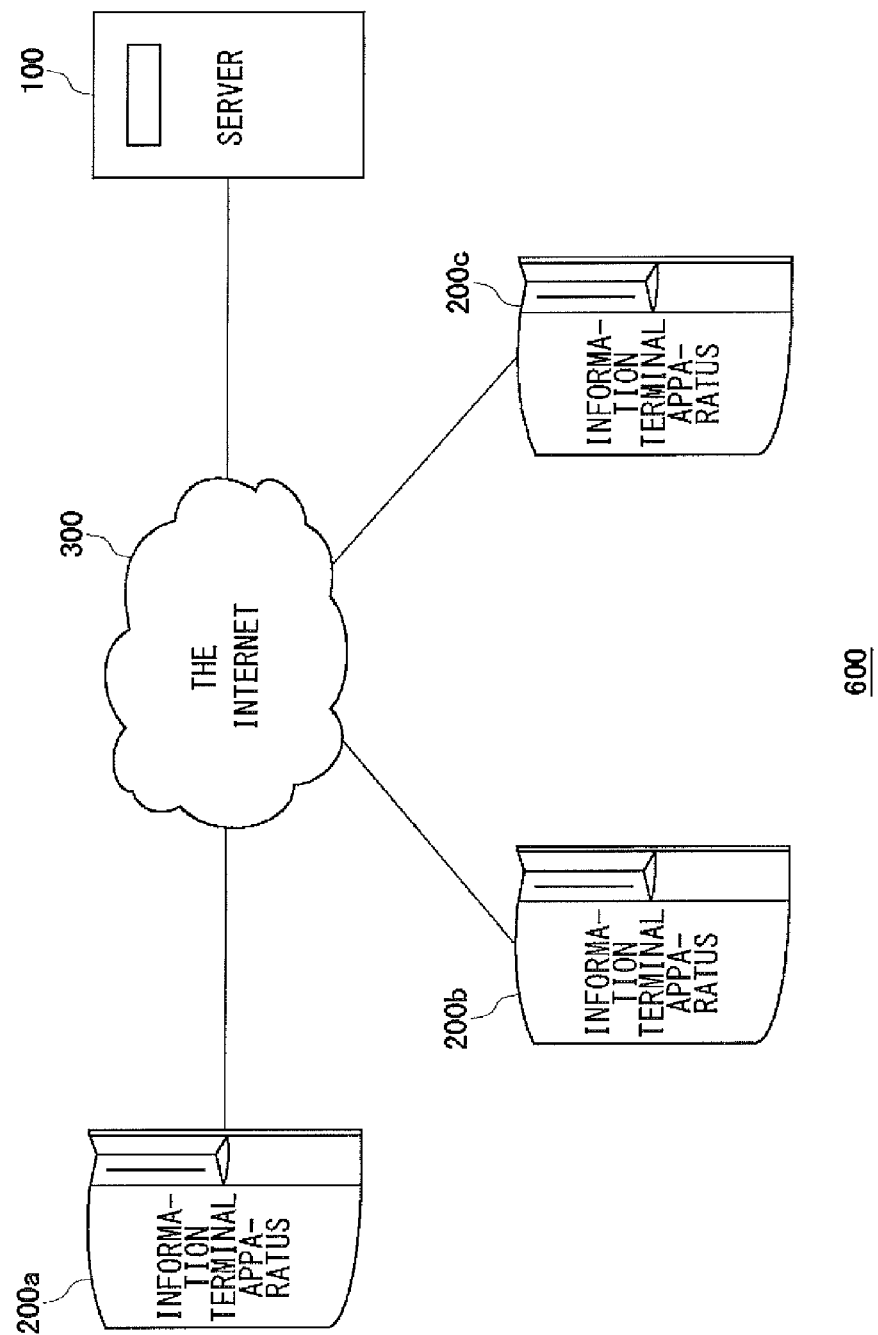
FIG. 1 is a diagram explaining the outline of a data access management system according to the embodiment.

FIG. 1 is a diagram explaining the outline of a data access management system 600 according to the embodiment. In the data access management system 600, a plurality of information terminal apparatuses 200a, 200b, and 200c are connected to a server 100 via a network using the Internet 300. The number of information terminal apparatuses 200 to be connected to the server 100 is not particularly limited. The plurality of information terminal apparatuses 200 are hereinafter generically referred to as information terminal apparatuses 200 unless the apparatuses need to be distinguished from one another.

The server 100 stores save data of a game executed on an information terminal apparatus 200. The "save data of a game" means, for example, status information that is updated according to the progress of the game. Different from digital picture data, etc., the save data of a game is rewritten according to the progress of the game. Meanwhile, different from document data, etc., the save data of a game is normally saved or loaded at specific timing in the progress of the game.

An explanation is given by using save data of a role playing game (RPG) as a specific example. Loading save data of a specific scene from a game in progress, for example, save data saved immediately before a battle with a boss, allows the user to roll back to the scene. Even if the boss is so tough to beat that the game cannot be progressed any further, the user can start over the game. As described, the save data of a game is updated according to the progress of the game and is also used to store a plurality of logs of the progress of the game so as to roll back the logs later.

Therefore, if game data can be saved or loaded at arbitrary timing, it can be possible that the degree of difficulty of the game is lowered, thus lowering the game values. The server 100 manages access to the save data by the user.

Figure 2:
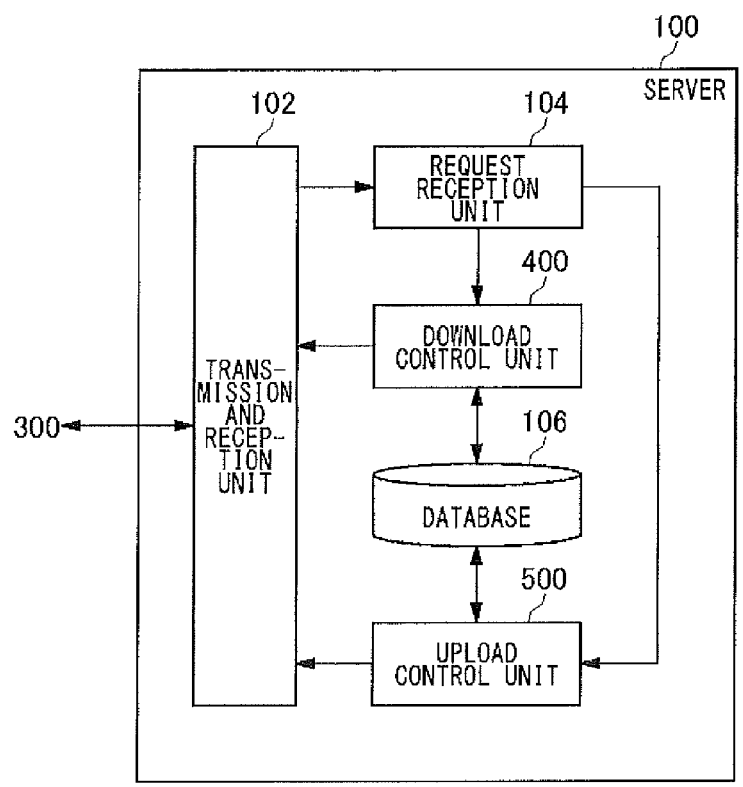
FIG. 2 is a diagram schematically illustrating the functional configuration of a server according to the embodiment.

FIG. 2 is a diagram schematically illustrating the functional configuration of the server 100 according to the embodiment. The server 100 includes a transmission and reception unit 102, a request reception unit 104, a download control unit 400, a database 106, and an upload control unit 500.

FIG. 2 illustrates a functional configuration for realizing the server 100 according to the embodiment. Other configurations are omitted. In FIG. 2, the elements shown in functional blocks that indicate a variety of processes are implemented in hardware by any CPU (Central Processing Unit), main memory, or other LSI's (Large Scale Integrations), and in software by a program loaded in main memory, etc. Therefore, it will be obvious to those skilled in the art that the functional blocks may be implemented in a variety of manners by a combination of hardware and software.

The transmission and reception unit 102 is an interface that receives a request for downloading or uploading the save data of a game from the information terminal apparatus 200 via the Internet 300. The transmission and reception unit 102 can be realized by using a well-known technique such as, for example, a LAN (Local Area Network) card, etc. The request reception unit 104 receives a request for downloading or uploading the save data of the game from the information terminal apparatus 200 via the transmission and reception unit 102 and processes the request.

More specifically, upon reception of a request for downloading the save data from the user, the request reception unit 104 notifies the after-mentioned download control unit 400 of a series of information necessary for a download process such as information indicating the reception of the request, a user ID (IDentification) allowing for a unique identification of the user, a save data ID allowing for save data to be downloaded, etc. Upon reception of a request for uploading the save data from the user, the request reception unit 104 notifies the after-mentioned upload control unit 500 of a series of information necessary for an upload process.

The database 106 stores both save data of the game and a list showing the save data for each user registered with the server 100. Details of the list will be described later.

Figure 3:
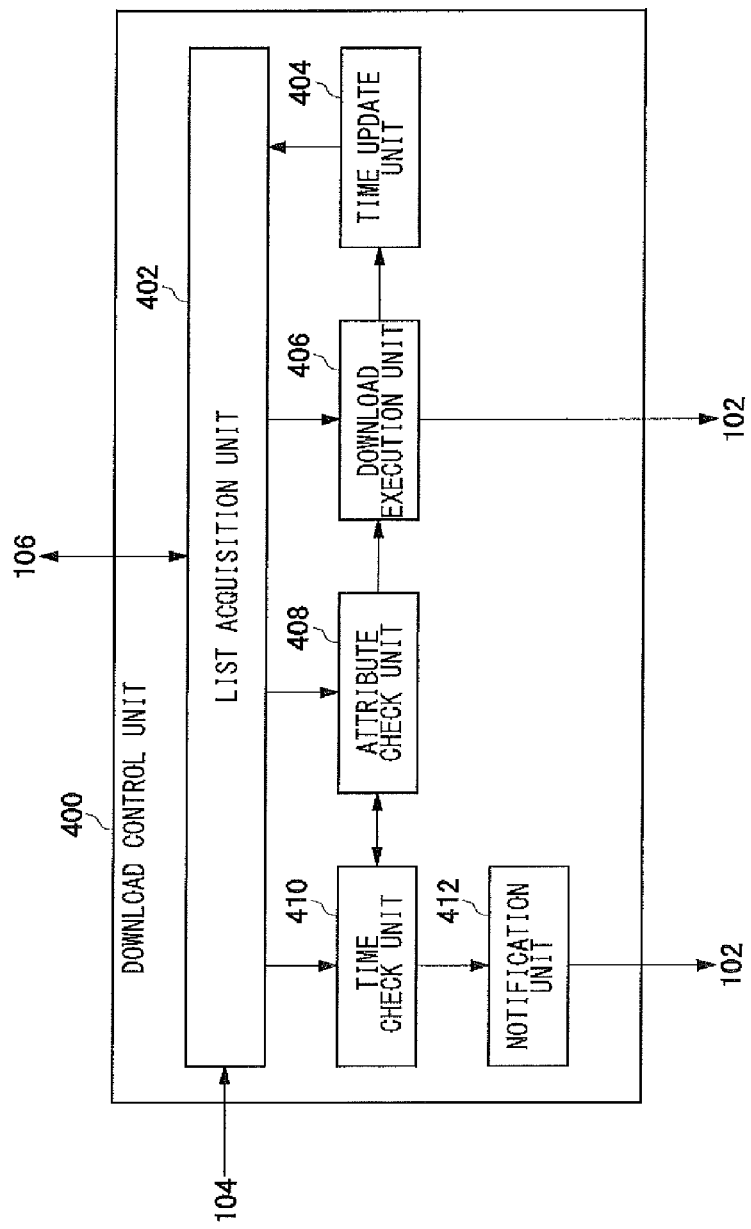
FIG. 3 is a diagram schematically illustrating the functional configuration of a download control unit according to the embodiment.

FIG. 3 is a diagram schematically illustrating the functional configuration of the download control unit 400 according to the embodiment. The download control unit 400 includes a list acquisition unit 402, a time update unit 404, a download execution unit 406, an attribute check unit 408, a time check unit 410, and a notification unit 412.

Upon reception of the series of information of the user that is necessary for the download process from the request reception unit 104, the list acquisition unit 402 acquires the list showing save data saved by the user from the database 106 based on the user ID.

FIG. 4 is a diagram schematically illustrating an example of a list stored in the database 106 according to the embodiment. As shown in FIG. 4, a save data ID, a save data attribute, and time at which the next download can be carried out are listed in association with one another in the database 106.

The "save data ID" means, for example, an identifier that uniquely identifies save data. Save data of a different game can be saved in the database 106 for the same user. The same user can save a plurality of save data items for the same game. Therefore, the "save data ID" includes information for identifying the title of a game and information of a serial number of save data under the title.

The "save data attribute" means, for example, restriction on downloading save data, i.e., information indicating whether or not making a copy of the save data by downloading is restricted. The "save data attribute" is set for each save data item. The user can download save data for which download is not restricted freely anytime. On the other hand, the user cannot download save data for which download is restricted, until a predetermined period of time passes after the user's last access to the save data.

The "access to the save data" includes, for example, uploading the save data to the database 106, downloading the save data from the database 106, and deleting the save data stored in the database 106. The "predetermined period of time" is reference time for determining whether or not save data is downloadable when a download of the save data is restricted, and the predetermined period of time is, for example, 24 hours. The predetermined period of time is not limited to 24 hours and needs to be determined through an experiment in consideration of a balance between ensuring game values and improving user-friendliness. An administrator of the server 100 can change the predetermined period of time anytime.

When a download of the save data is restricted, the time at which the next download can be carried out is also stored correspondingly in the database 106. More specifically, the time obtained 24 hours after the last access to the save data occurs is stored.

FIG. 3 is further explained. Referring to a list acquired by the list acquisition unit 402, the attribute check unit 408 checks whether or not save data requested to be downloaded has an attribute that indicates the download is restricted. When the save data requested to be downloaded does not have the attribute that indicates the download is restricted, the attribute check unit 408 permits a download of the save data and allows the download execution unit 406 to download the save data.

When the save data requested to be downloaded has the attribute indicating that a download is restricted, the attribute check unit 408 notifies the time check unit 410 that the save data has the attribute that indicates the download is restricted. Referring to the list acquired by the list acquisition unit 402, the time check unit 410 checks whether or not the request for downloading the save data was received at or after the time at which the save data becomes downloadable again.

When the request for downloading the save data was received before the time at which the save data becomes downloadable again, the time check unit 410 notifies the attribute check unit 408 and the notification unit 412 that the request for downloading the save data was received before the time at which the save data becomes downloadable again. As a result, the attribute check unit 408 rejects a download of the save data and prevents the download execution unit 406 from downloading the save data. The notification unit 412 notifies the user of the next downloadable time via a network.

Figure 5:
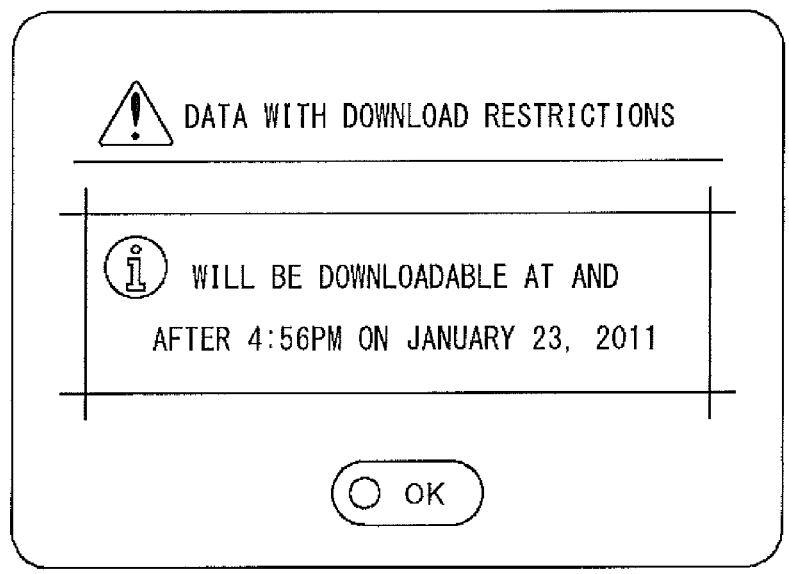
FIG. 5 is a diagram illustrating an example of a screen presented by a notification unit according to the embodiment.

FIG. 5 is a diagram illustrating an example of a screen presented by the notification unit 412 according to the embodiment. As shown in FIG. 5, save data that is about to be downloaded is displayed as data for which download is restricted. Furthermore, the next downloadable time is also displayed specifically on a display screen such as a monitor used by the user. After checking the notification screen, the user can delete the display by pressing down a button of a controller or the like of the information terminal apparatus 200. This allows waiting time necessary for downloading the save data to be easily checked. This can be realized by using a well-known technique of, for example, a GUI (Graphical User Interface), etc.

When the request for downloading the save data was received after the time at which the save data becomes downloadable again, the time check unit 410 notifies the attribute check unit 408 that the request for downloading the save data was received after the time at which the save data becomes downloadable again. As a result, the attribute check unit 408 permits a download of the save data and allows the download execution unit 406 to download the save data. When the download execution unit 406 allows the user to download the save data, the time update unit 404 updates the time at which the downloaded save data becomes downloadable again. The list acquisition unit 402 stores in the database 106 the list where the next downloadable time is updated.

Figure 6:
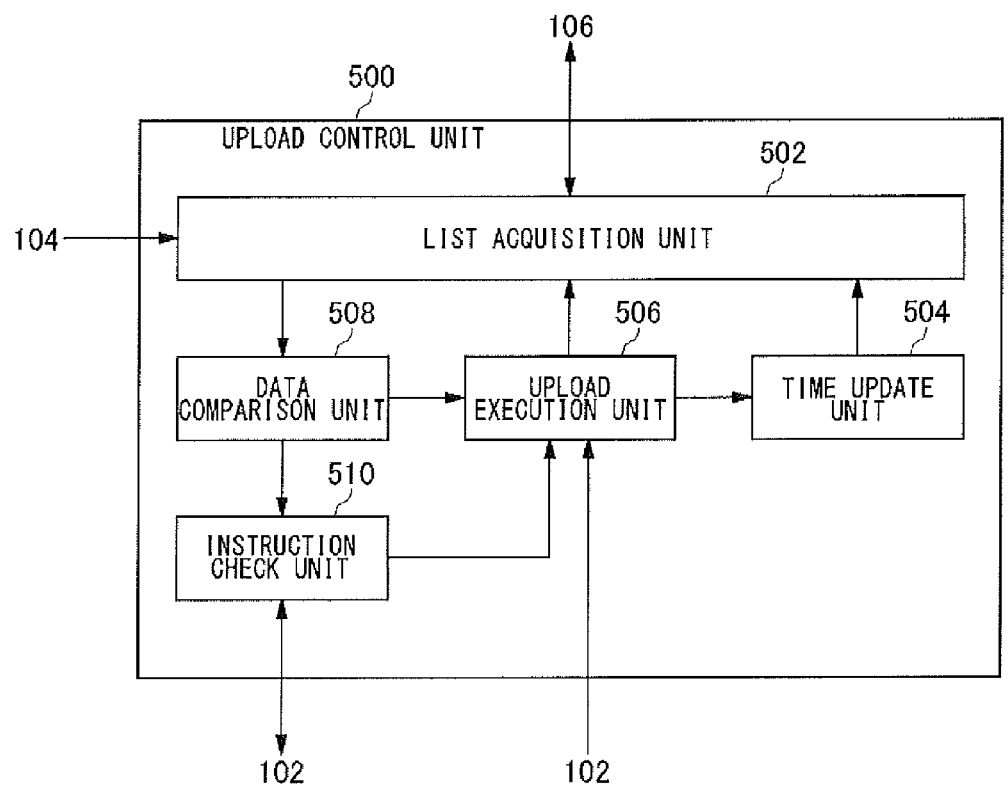
FIG. 6 is a diagram schematically illustrating the functional configuration of an upload control unit according to the embodiment.

FIG. 6 is a diagram schematically illustrating the functional configuration of the upload control unit 500 according to the embodiment. The upload control unit 500 includes a list acquisition unit 502, a time update unit 504, an upload execution unit 506, a data comparison unit 508, and an instruction check unit 510.

Just like the list acquisition unit 402 in the download control unit 400, upon reception of the series of information of the user that is necessary for the upload process from the request reception unit 104, the list acquisition unit 502 acquires the list showing save data saved by the user from the database 106 based on the user ID. The "series of information that is necessary for the upload process" includes save data that is desired to be uploaded, in addition to the user ID and the save data ID.

Referring to a list acquired by the list acquisition unit 502, the data comparison unit 508 checks whether or not save data, which is the same as the save data requested to be uploaded, is already registered in the database 106. More specifically, the data comparison unit 508 checks whether or not the respective save data ID's of the save data items to be compared are the same and determines that the both save data items are the same when the save data ID's are the same. Instead of or in addition to the comparison of the save data ID's, the data comparison unit 508 may perform a binary comparison on the save data items to be compared so as to determine that the save data items are identical to each other when the both save data items are the same.

When save data, which is the same as the save data requested to be uploaded, is already registered, the data comparison unit 508 notifies the instruction check unit 510 that the save data, which is the same as the save data requested to be uploaded, is already registered. The instruction check unit 510 presents, via the transmission and reception unit 102, a prompt for the user to select whether or not the registered save data is to be overwritten with the save data requested to be uploaded. When the save data is selected not to be overwritten thorough the user's instruction, the instruction check unit 510 cancels the upload of the save data and discontinues the upload of the save data by the upload execution unit 506.

When the save data is selected to be overwritten by the user through an instruction, the instruction check unit 510 allows the upload execution unit 506 to overwrite the registered save data with the uploaded save data. When the upload execution unit 506 updates the save data, the time update unit 504 updates the next downloadable time. The list acquisition unit 402 stores in the database 106 the list where the next downloadable time is updated.

When it is confirmed that the same save data is not registered, the data comparison unit 508 permits an upload of the save data and allows the upload execution unit 506 to upload the save data requested to be uploaded and then register the uploaded save data in the database 106. When the upload execution unit 506 updates the save data, the time update unit 504 updates the next downloadable time. The list acquisition unit 402 stores in the database 106 the list where the next downloadable time is updated.

Notifying the user whether or not the same data is to be overwritten can prevent the user from erroneously uploading the same save data. Uploading the same save data is different from a simple overwriting of data if the save data has the attribute that indicates the download is restricted. In other words, since the next downloadable time will be delayed, the status of the save data will be changed. Therefore, it is useful in improving the user-friendliness to check in advance whether or not the save data having the attribute that indicates the download is restricted is to be overwritten and uploaded.

Figure 7:
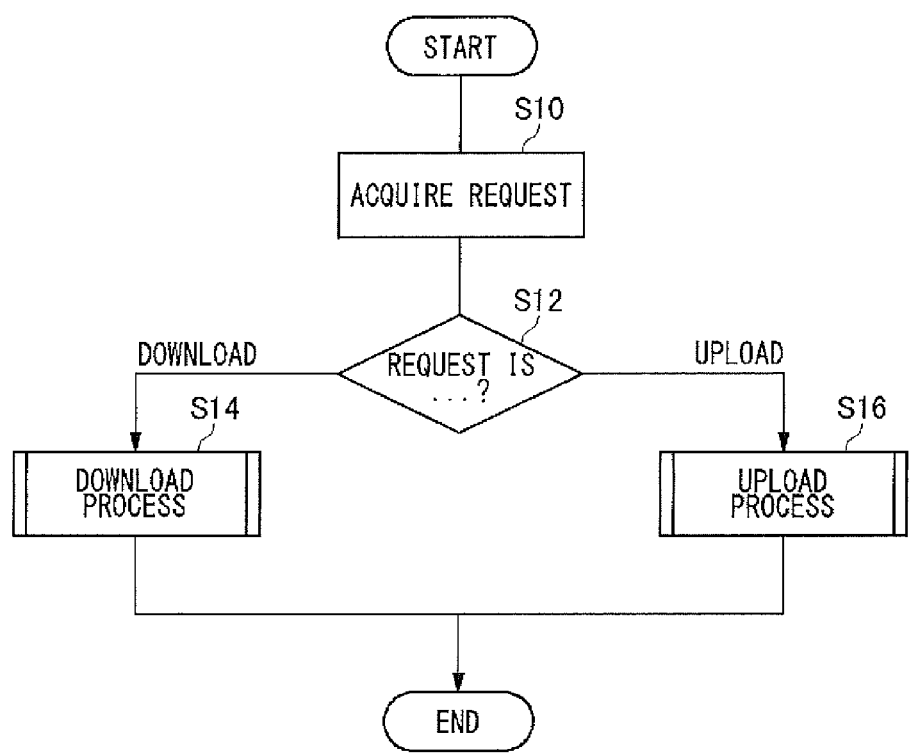
FIG. 7 is a flowchart illustrating a process flow of the data access management system according to the embodiment.

FIG. 7 is a flowchart illustrating a process flow of the data access management system 600 according to the embodiment. A flowchart shown in the following displays the processing procedure of components by a combination of a letter "S" (the initial of the word "Step"), which represents a step, and a number. When some sort of a determination process is performed by a process displayed by a combination of a letter "S" and a number, the processing procedure is displayed while adding a letter "Y" (the initial of the word "Yes") when the determination result is positive (e.g., Y in S22) and is displayed while adding a letter "N" (the initial of the word "No") when the determination result is negative (e.g., N in S22). Processes shown in the flowchart are started when the server 100 acquires a request for accessing data from the user.

The request reception unit 104 acquires a request for accessing save data via the transmission and reception unit 102 from the information terminal apparatus 200 in use by the user (S10). When a request process acquired by the request reception unit 104 is directed to a download request (download in S12), the download control unit 400 executes a download process of the save data (S14). When the request process acquired by the request reception unit 104 is directed to an upload request (upload in S12), the upload control unit 500 executes an upload process of the save data (S16). Upon execution of the download process by the download control unit 400, or upon execution of the upload process by the upload control unit 500, the processes in the flowchart are completed.

Figure 8:
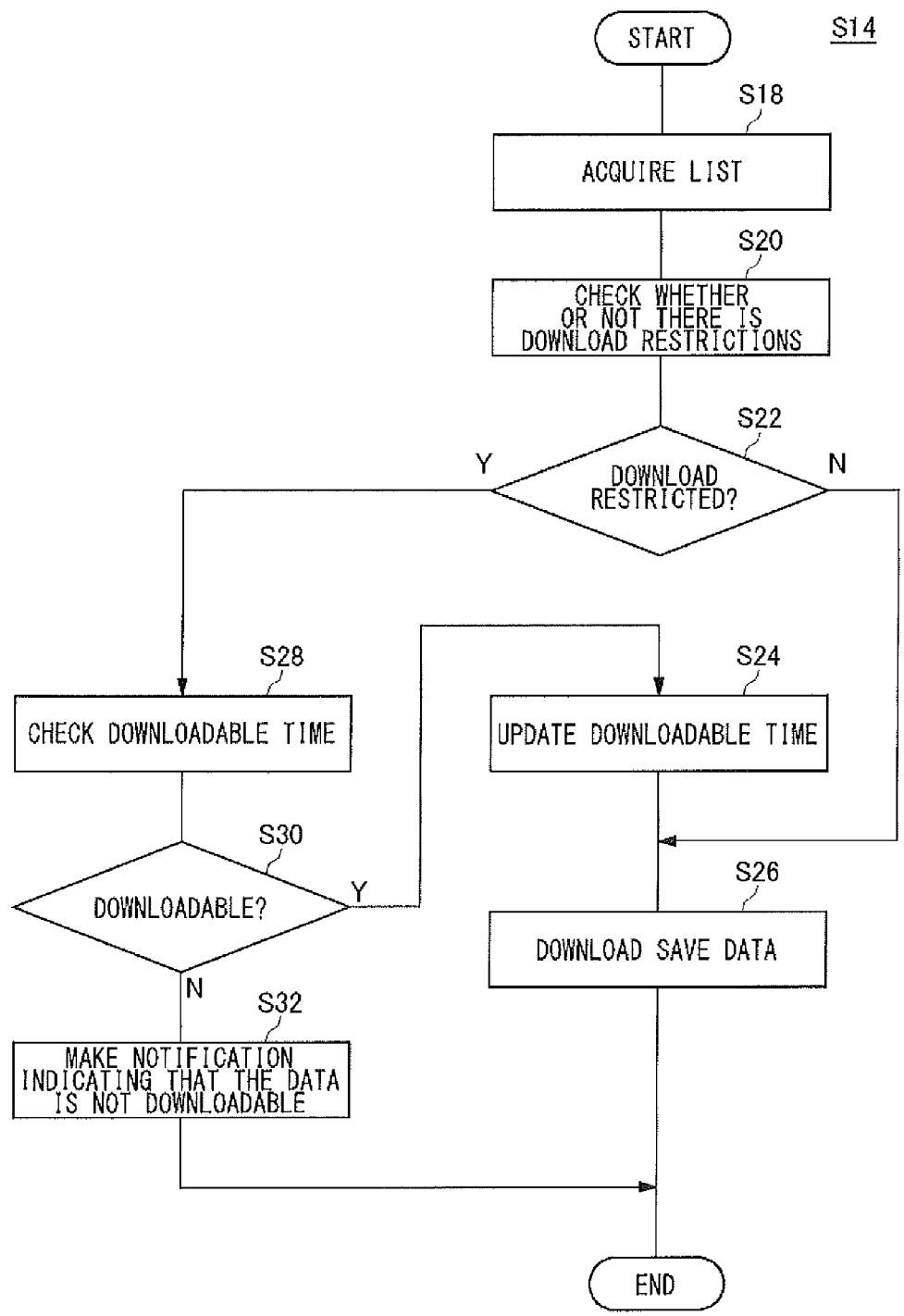
FIG. 8 is a flowchart illustrating a process flow of the download control unit according to the embodiment.

FIG. 8 is a flowchart illustrating a process flow of the download control unit 400 according to the embodiment and is a diagram explaining the details of the step S14 in FIG. 7.

The list acquisition unit 402 acquires from the database 106 a list of save data requested to be downloaded by the user (S18). Referring to the list, the attribute check unit 408 checks whether or not the save data requested to be downloaded has an attribute that indicates the download is restricted (S20).

When the save data requested to be downloaded does not have the attribute that indicates the download is restricted (N in S22), the download execution unit 406 downloads, for the user, the save data requested to be downloaded (S26).

When the save data requested to be downloaded has the attribute that indicates the download is restricted (Y in S22), the time check unit 410 checks whether or not the download was requested after the time at which the save data becomes downloadable again (S28). When the download was requested after the time at which the save data becomes downloadable again, and when the save data is thus downloadable (Y in S30), the time update unit 404 updates the time at which the save data to be downloaded becomes downloadable again (S24). The download execution unit 406 downloads, for the user, the save data requested to be downloaded (S26).

When the download was requested before the time at which the save data becomes downloadable again, and when the save data is thus not downloadable (N in S30), the notification unit 412 notifies the user that a download of the save data is not permitted and of the next downloadable time, via the transmission and reception unit 102 (S32). When the notification unit 412 notifies the user, or when the download execution unit 406 downloads for the user the save data requested to be downloaded, the processes in the flowchart are completed.

Figure 9:
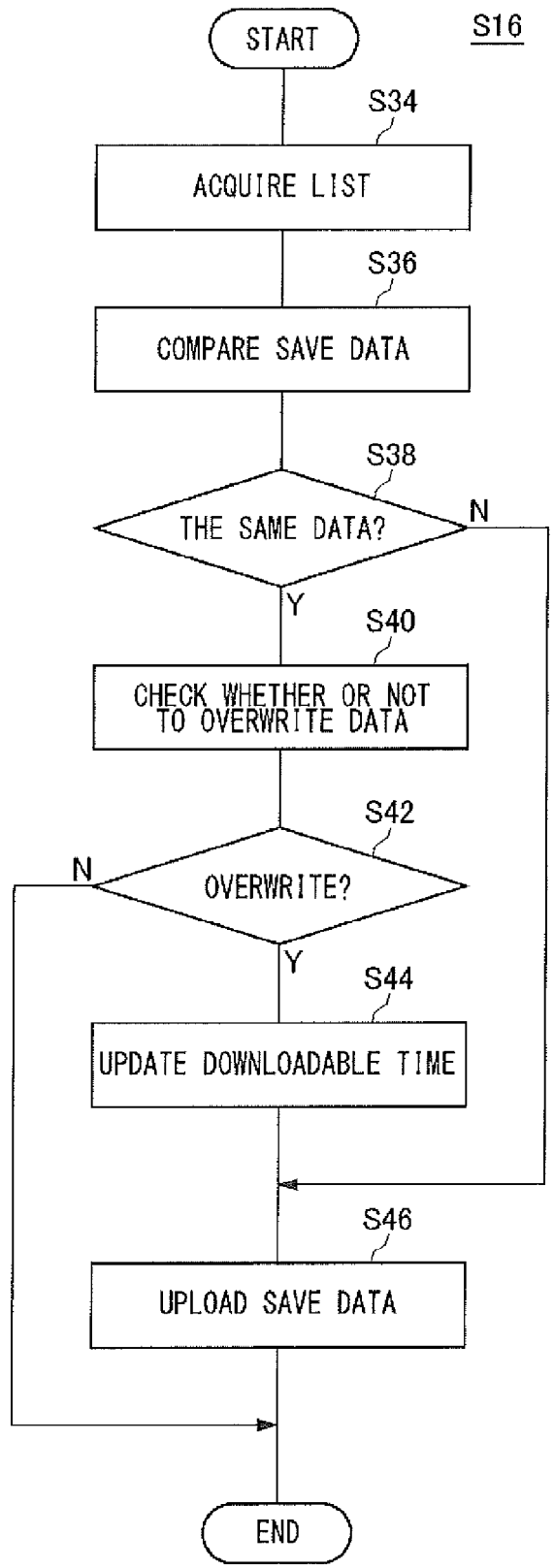
FIG. 9 is a flowchart illustrating a process flow of the upload control unit according to the embodiment.

FIG. 9 is a flowchart illustrating a process flow of the upload control unit 500 according to the embodiment and is a diagram explaining the details of the step S16 in FIG. 7.

The list acquisition unit 502 acquires from the database 106 a list of save data requested to be uploaded by the user (S34). The data comparison unit 508 makes a comparison to determine whether or not the save data to be uploaded is the same as save data that is already registered in the database 106 (S36).

When the save data to be uploaded is the same as the save data that is already registered in the database 106 (Y in S38), the instruction check unit 510 checks with the user via the transmission and reception unit 102 whether or not the save data is to be overwritten (S40). When the user selects to overwrite the save data (Y in S42), the time update unit 504 updates the time at which the save data to be uploaded becomes downloadable (S44). The upload execution unit 506 uploads the save data to be uploaded overwriting the save data that is already registered in the database 106 (S46).

When the user selects not to overwrite the save data (N in S42), the instruction check unit 510 rejects the upload of the save data, and the upload execution unit 506 does not perform any particular process.

When the save data to be uploaded is not the same as the save data that is already registered in the database 106 (N in S38), the upload execution unit 506 uploads the save data to be uploaded overwriting the save data that is already registered in the database 106 (S46). When the user selects not to overwrite the save data, or when the upload execution unit 506 uploads the save data to be uploaded overwriting the save data that is already registered in the database 106, the process in the flowchart is completed.

The operation of the above configuration is shown in the following. The user of the information terminal apparatus 200 makes a request to the server 100 via the Internet 300 for downloading game save data. The download control unit 400 checks whether or not the save data to be downloaded has the attribute that indicates the download is restricted and permits the download when the save data to be downloaded has the attribute that indicates the download is restricted and when the download request was made at or after the time at which the save data becomes downloadable.

The user of the information terminal apparatus 200 makes a request to the server 100 via the Internet 300 for uploading game save data. The upload control unit 500 checks whether or not save data, which is the same as the save data to be uploaded, is already registered in the server 100. When the same save data is already registered in the server 100, the upload control unit 500 makes a notification in such a manner that the user can select whether or not the save data is to be overwritten.

As explained in the above, by putting restrictions on the timing for uploading or downloading save data, a cloud service can be provided for managing the save data of a game, etc., on a network while ensuring game values represented by the entertainment value of the game and the balance of the game, according to the embodiment of the present invention.

Described above is an explanation of the present invention based on the embodiment. The embodiment is intended to be illustrative only, and it will be obvious to those skilled in the art that various modifications to constituting elements and processes could be developed and that such modifications are also within the scope of the present invention.

(First Exemplary Variation)

In the above explanation, an explanation is given regarding a case where the download control unit 400 and the upload control unit 500 are in the server 100. However, the download control unit 400 and the upload control unit 500 may be in the information terminal apparatus 200. An explanation is given of such an exemplary variation in the following. Explanations that are similar to those described in the above embodiment are appropriately omitted or simplified.

Figure 10:
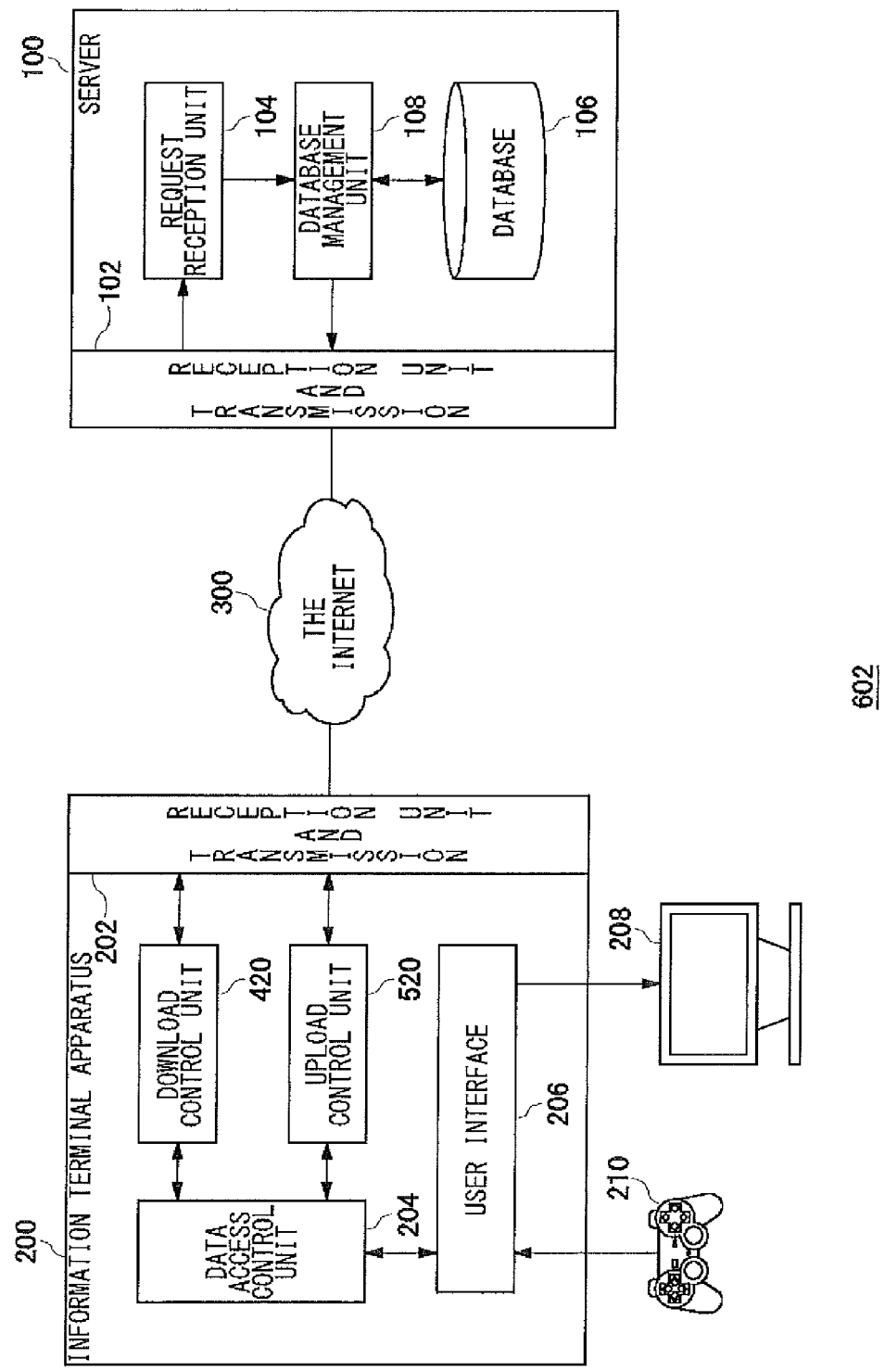
FIG. 10 is a diagram schematically illustrating the functional configuration of the data access management system according to the exemplary variation of the embodiment.

FIG. 10 is a diagram schematically illustrating the functional configuration of a data access management system 602 according to the exemplary variation of the embodiment. In the data access management system 602, an information terminal apparatus 200 and a server 100 can communicate with each other via an Internet 300.

The information terminal apparatus 200 includes a transmission and reception unit 202, a data access control unit 204, a user interface 206, a download control unit 420, and an upload control unit 520. The information terminal apparatus 200 is connected to a controller 210 and a monitor 208 via the user interface 206. The internal configuration of the download control unit 420 is similar to that of the download control unit 400 shown in FIG. 3. The internal configuration of the upload control unit 520 is similar to that of the upload control unit 500 shown in FIG. 6.

The user can make a request for accessing save data to the server 100 by operating the controller 210 while watching the monitor 208. The data access control unit 204 acquires the request for accessing the save data from the user via the user interface 206. When the request for accessing the save data is a request for downloading the save data, the data access control unit 204 allows the download control unit 420 to execute the request for downloading the save data. When the request for accessing the save data is a request for uploading the save data, the data access control unit 204 allows the upload control unit 520 to execute the request for uploading the save data.

The server 100 includes a transmission and reception unit 102, a request reception unit 104, a database 106, and a database management unit 108. Upon reception of the request for accessing the save data from the user via the transmission and reception unit 102, the request reception unit 104 notifies the database management unit 108 that the request reception unit 104 has received the request for accessing the save data. Regardless of whether the access request is a download request or an upload request, the database management unit 108 acquires from the database 106 a list showing the save data saved by the user requesting for the access. Following that, the database management unit 108 transmits via the transmission and reception unit 102 the acquired list to the information terminal apparatus 200 that is being used by the user requesting for the access.

When the data access request from the user is a download request, a list acquisition unit 402 in the download control unit 420 acquires the list of the save data from the database management unit 108. The operation of the download control unit 420 after the acquisition of the list by the list acquisition unit 402 is similar to that of the download control unit 400 according to the above-stated embodiment. A notification unit 412 in the download control unit 420 displays a selection screen on the monitor 208 via the data access control unit 204 and the user interface 206 and acquires a user's selection through the controller 210. A download execution unit 406 in the download control unit 420 downloads the save data from the database 106 in the server 100 via the transmission and reception unit 202.

When the data access request from the user is an upload request, a list acquisition unit 502 in the upload control unit 520 acquires the list of the save data from the database management unit 108. The operation of the upload control unit 520 after the acquisition of the list by the list acquisition unit 502 is similar to that of the upload control unit 500 according to the above-stated embodiment. Note that an instruction check unit 510 in the upload control unit 520 makes a notification on the monitor 208 via the data access control unit 204 and the user interface 206. An upload execution unit 506 in the upload control unit 520 uploads the save data to the database 106 in the server 100 via the transmission and reception unit 202 for overwriting.

As described above, the data access management system 602 according to the exemplary variation allows load distribution of the server 100 to be achieved by allowing the information terminal apparatus 200 to perform specific processes for the save data access. This is advantageous in that the number of requests for the save data access to be processed at the same time by the server 100 can be increased.

(Second Exemplary Variation)

In the above explanation, an explanation is given regarding a case where a restriction is put on the access to save data during a predetermined period of time. However, a restriction on the access to save data is not limitedly imposed based on time. For example, the restriction may be imposed based on an age requirement for a game. More specifically, when a game for which the user requests for access to save data has an age requirement, the access to the save data may be restricted if the user's age does not satisfy the age requirement. This can be realized by, for example, connecting a user ID to the database 106 so as to store the user's age and the age requirement for the game. In this case, an age verification unit (not shown) in the download control unit 400 or the upload control unit 500 needs to conduct age verification.

(Third Exemplary variation)

The server 100 may serve to function as a parental control server. More specifically, a user subject to parental controls is permitted to download save data during a specific time period. Alternatively, the number of times for downloading save data is limited for a user subject to parental controls. This can be realized by, for example, connecting a user ID to the database 106 so as to store information such as an attribute indicating whether or not the user is subject to parental controls, a time period during which the download is permitted, and the number of times allowed for the download. In this case, a parental control check unit (not shown) in the download control unit 400 or the upload control unit 500 needs to control the access to the save data.

(Fourth Exemplary variation)

In the above explanation, an explanation is given regarding a case where a restriction is put on the access to save data during a predetermined period of time. However, a restriction on the access to save data may be lifted during a specific period of time. For example, the restriction on the access to save data is lifted on the user's birthday, during Christmas, during a campaign period for user's registration with the server 100, etc. In this case, for example, the instruction check unit 510 in the upload control unit 500 presents the user that a campaign is going on and also presents a prompt for the user to select whether or not the restriction on the access to the save data is to be lifted during the specific period of time. If the user expresses his/her intention to participate in the campaign, an attribute indicating that the user is participating in the campaign is registered in the database 106 in connection with the user ID. The attribute check unit 408 in the download control unit 400 allows the restriction on the access to the save data to be lifted during the specific period of time by checking the presence of the attribute indicating that the user is participating in the campaign and then by controlling the download of the save data.

(Fifth Exemplary variation)

In the above explanation, an explanation is given regarding a case where a restriction is put on the access to save data during a predetermined period of time. However, a restriction on the access to save data is not limitedly imposed based on time. For example, the restriction may be imposed based on a sales area of a game. More specifically, when an area in which an access point used by the user when requesting for the access to the save data of a game exists is not an area where the game is sold, the access to the save data of the game may be restricted. This can be realized by, for example, connecting the tile of the game to the database 106 so as to store the sales area of the game. In this case, a sales area verification unit (not shown) in the download control unit 400 or the upload control unit 500 needs to check whether or not the area in which the access point exists is a sales area of the game.

What is claimed is:

1. A data access management method configuring one or more processors to execute instructions from at least one memory to perform the steps, comprising:

receiving via a network a request for downloading a first instance of save data among a plurality of instances of save data stored in a database, each instance of save data serving as status information according to the progress of a game at given points of gameplay, acquiring a list from the database and storing the list in memory, the list including a plurality of entries, each entry for a respective one of the plurality of instances of save data and each entry including: (i) an identifier that uniquely identifies the instance of save data, (ii) an attribute indicating whether or not downloading of the instance of save data is restricted, and (iii) a time at which the instance of save data may be next downloaded, checking whether or not the attribute for the first instance of save data requested to be downloaded indicates such download is restricted, checking, when the attribute of the first instance of save data indicates the download is restricted, whether or not the request for downloading the save data is received at or after the time at which the first instance of save data may be next downloaded, permitting the downloading of the first instance of save data when the request for downloading the first instance of save data is received at or after the time at which the first instance of save data may be next downloaded, rejecting the request for downloading the first instance of save data and notifying a user of the time at which the first instance of save data may be next downloaded, when the request for downloading the first instance of save data is received before the time at which the first instance of save data may be next downloaded, receiving a request for uploading a second instance of save data from the user via the network, where the second instance of save data is of a same type as the first instance of save data, as each of the first and second instances of save data serve as status information according to the progress of at least one of: (i) a same game, and (ii) a same point in gameplay of the same game, and uploading the second instance of save data in the database, entering an identifier that uniquely identifies the second instance of save data into the list, entering an attribute indicating whether or not downloading of the second instance of save data is restricted into the list, and entering a time at which the second instance of save data may be next downloaded into the list, wherein the time at which the second instance of save data may be next downloaded is the time of uploading the second instance of save data plus a predetermined delay time.

2. The data access management method according to claim 1, further comprising:
allowing the user to download the second instance of save data when at least one of: (i) the save data requested to be downloaded does not have the attribute that indicates the download is restricted, and (ii) the request for downloading the save data is received within the time period in which the second instance of save data may be next downloaded; and
updating and then storing a new time at which the second instance of save data may be next downloaded into the list, wherein the new time at which the second instance of save data may be next downloaded is the time of downloading the second instance of save data plus the predetermined delay time.

3. The data access management method according to claim 2, wherein the time at which second instance of may be next downloaded is the time of uploading the second instance of save data plus the predetermined delay time or the time of downloading the second instance of save data plus the predetermined delay time, whichever is later.

4. The data access management method according to claim 1, further comprising:

checking whether or not a third instance of save data is an exact copy of the second instance of save data via reference to the list acquired from the database; and uploading the third instance of save data so as to register the third instance of save data in the database, and storing a time at which the third instance of save data may be next downloaded into the list, wherein the time at which the third instance of save data may be next downloaded is the time of uploading the third instance of save data plus the predetermined delay time, when an exact copy of the third instance save data is not already registered.

5. The data access management method according to claim 4, further comprising:
presenting, when the third instance of save data is an exact copy of the second instance of save data, a prompt for the user to select whether or not the second instance of save data is to be overwritten with the third instance of save data requested to be uploaded; and
when the second instance of save data is selected to be overwritten by the user, overwriting the second instance of save data with the third instance of save data, and updating and then storing the time at which the third instance of save data may be next downloaded into the list.

6. A non-transitory computer-readable recording medium, containing a computer program that when executed by one or more processors causes a computer to provide:
a request reception module configured to receive via a network a request for downloading a first instance of save data among a plurality of instances of save data stored in a database, each instance of save data serving as status information according to the progress of a game at given points of gameplay;
an attribute check module configured to: (a) acquire a list from the database and store the list in memory, the list including a plurality of entries, each entry for a respective one of the plurality of instances of save data and each entry including: (i) an identifier that uniquely identifies the instance of save data, (ii) an attribute indicating whether or not downloading of the instance of save data is restricted, and (iii) a time at which the instance of save data may be next downloaded, and (b) check whether or not the attribute for the first instance of save data requested to be downloaded indicates such download is restricted;
a time check module configured to check, when the attribute of the first instance of save data indicates the download is restricted, whether or not the request for downloading the save data is received at or after the time at which the first instance of save data may be next downloaded; and
a notification module configured to: (i) permit the downloading of the first instance of save data when the request for downloading the first instance of save data is received at or after the time at which the first instance of save data may be next downloaded, and (ii) reject the request for downloading the first instance of save data and notifying a user of the time at which the first instance of save data may be next downloaded, when the request for downloading the first instance of save data is received before the time at which the first instance of save data may be next downloaded,
a request reception module configured to receive a request for uploading a second instance of save data from the user via the network, where the second instance of save data is of a same type as the first instance of save data, as each of the first and second instances of save data serve as status information according to the progress of at least one of: (i) a same game, and (ii) a same point in gameplay of the same game, and an upload module configured to upload the second instance of save data in the database, entering an identifier that uniquely identifies the second instance of save data into the list, entering an attribute indicating whether or not downloading of the second instance of save data is restricted into the list, and entering a time at which the second instance of save data may be next downloaded into the list, wherein the time at which the second instance of save data may be next downloaded is the time of uploading the second instance of save data plus a predetermined delay time.

7. A data access management system comprising:

a server; and a plurality of information terminal apparatuses connected to the server via a network, wherein the server includes:

a request reception unit configured to receive a request for downloading or uploading one or more instances of save data among a plurality of instances of save data, each instance of save data serving as status information that is updated according to the progress of a game at given points of gameplay, from any one of the plurality of information terminal apparatuses via a network;

a database containing the plurality of instances of save data and a list including a plurality of entries, each entry for a respective one of the plurality of instances of save data and each entry including: (i) an identifier that uniquely identifies the instance of save data, and (ii) an attribute indicating whether or not downloading of the instance of save data is restricted, and (iii) a time at which the instance of save data may be next downloaded; and a database management unit configured to transmit one or more entries of the list stored in the database to the information terminal apparatus from which the request for downloading or uploading the one or more instances of save data was made, wherein each of the plurality of the information terminal apparatuses includes: a download control unit and an upload control unit, wherein each of the download control units includes:

a list acquisition unit configured to make a request for downloading the one or more instances of save data from the server and acquiring the one or more entries of list from the server, via the network;

an attribute check unit for checking whether or not a given instance save data requested to be downloaded has the attribute that indicates the download is restricted via reference to the list acquired by the list acquisition unit;

a time check unit configured to check, when the given instance of save data requested to be downloaded has the attribute that indicates the download is restricted, whether or not the request for downloading the given instance of save data is made at or after the time at which the given instance of save data may be next downloaded, via reference to the list;

a notification unit configured to notify a user of the time at which the given instance of save data may be next downloaded when the request for downloading the save data is made before the time at which the given instance of save data may be next downloaded;

a download execution unit configured to allow the given instance of save data to be downloaded from the server when at least one of: (i) the given instance of save data requested to be downloaded does not have the attribute that indicates the download is restricted, and (ii) the request for downloading the given instance of save data is made at or after the time at which the given instance of save data may be next downloaded; and a time update unit configured to transmit to the database a new time at which the given instance of save data may be next downloaded, where the new time is the time of downloading the given instance of save data plus a predetermined delay time, wherein each of the upload control units includes:

a list acquisition unit configured to make a request for uploading the one or more instances of save data to the server and acquiring one or more entries of the list from the server, via the network;

an attribute check unit configured to check whether or not a given instance of save data requested to be uploaded has an attribute that indicates a download of the given instance of save data is restricted via reference to the list acquired by the list acquisition unit; and a time update unit configured to upload the given instance of save data requested to be uploaded so as to register the given instance of save data and storing in the database a time at which the given instance of save data may be next downloaded, where the time is the time of uploading the given instance of save data plus a predetermined delay time.

* * * * *